(12) United States Patent
Brun et al.

(10) Patent No.: US 11,713,781 B2
(45) Date of Patent: Aug. 1, 2023

(54) COUNTERBORE PROTECTION DISH FOR MOUNTING WITHOUT INTERFERENCE

(71) Applicant: SAFRAN AIRCRAFT ENGINES, Paris (FR)

(72) Inventors: Guillaume Matthieu Jean-Louis Brun, Chilly-Mazarin (FR); Guillaume Arnaud Michel Chassin, Ris Orangis (FR); Geoffray Henri Robert Leguery, Paris (FR); Matthieu Jean-Luc Marc Loger, Orly (FR); Guillaume Perez, Ballainvilliers (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1113 days.

(21) Appl. No.: 16/413,404

(22) Filed: May 15, 2019

(65) Prior Publication Data
US 2020/0025237 A1    Jan. 23, 2020

(30) Foreign Application Priority Data
May 17, 2018   (FR) ........................................ 1854111

(51) Int. Cl.
*F16B 43/00*   (2006.01)
*B64D 33/00*   (2006.01)

(52) U.S. Cl.
CPC .............. *F16B 43/00* (2013.01); *B64D 33/00* (2013.01); *F16B 2043/008* (2013.01)

(58) Field of Classification Search
CPC .. F16B 2043/008; F16B 43/00; F16B 43/004; F16B 5/02; F16B 39/24; F16B 39/26
(Continued)

(56) References Cited

U.S. PATENT DOCUMENTS

| 5,209,895 A | * | 5/1993 | Wivagg | ................. | G21C 3/334 |
| | | | | | 411/360 |
| 2015/0219140 A1 | * | 8/2015 | Jenning | ................. | F16B 33/004 |
| | | | | | 29/458 |

(Continued)

FOREIGN PATENT DOCUMENTS

FR   2775032 A1   8/1999
FR   2965008 A1   3/2012
(Continued)

OTHER PUBLICATIONS

Preliminary Research Report and Written Opinion received for French Application No. 1854111, dated Nov. 13, 2018, 11 pages (1 page of French Translation Cover Sheet and 10 pages of original document).

*Primary Examiner* — William V Gilbert
(74) *Attorney, Agent, or Firm* — Womble Bond Dickinson (US) LLP (57) ABSTRACT

The invention relates to a protection dish (32) for a counterbore formed in an aircraft mechanical part, said protection dish (32) having an axial cross-section about an axis (A) having substantially the shape of a U, and comprising a substantially annular wall (34) of axis (A) and a substantially cylindrical rim (36) of axis (A) connected to an outer periphery of said substantially annular wall (34). The invention is characterised in that said dish (32) is configured to be deformed in response to an axial stress (F) of a determined intensity applied on the substantially annular wall (34) thereof from a first state, wherein the substantially cylindrical rim (36) has a first transverse dimension (E) relative to axis (A), to a second state, wherein the substantially annular wall (34) being deformed, the cylindrical rim (36) has a second transverse dimension (E') relative to the axis (A) that (Continued)

is greater than the first transverse dimension (E) along a transverse direction (T) determined relative to axis (A).

10 Claims, 5 Drawing Sheets

(58) Field of Classification Search
USPC ......... 244/131, 132; 411/270, 541, 544, 546
See application file for complete search history.

(56) References Cited

U.S. PATENT DOCUMENTS

| | | | |
|---|---|---|---|
| 2015/0226252 A1* | 8/2015 | Bennett | F16B 41/005 |
| | | | 411/161 |
| 2017/0114822 A1* | 4/2017 | Garcia | F16B 39/24 |
| 2017/0175801 A1* | 6/2017 | Mickelsen | F01D 25/243 |
| 2017/0268546 A1* | 9/2017 | Stilin | F16B 43/00 |
| 2018/0073252 A1* | 3/2018 | Janko | E04G 23/0214 |
| 2019/0006788 A1* | 1/2019 | Cerfeuillet | H01R 4/5025 |
| 2019/0078599 A1* | 3/2019 | Pinney | F02K 1/822 |
| 2020/0147768 A1* | 5/2020 | Griechen | B25B 23/10 |

FOREIGN PATENT DOCUMENTS

| | | |
|---|---|---|
| FR | 3032223 A1 | 8/2016 |
| FR | 3056653 A1 | 3/2018 |
| WO | 98/04856 A1 | 2/1998 |

* cited by examiner

COUNTERBORE PROTECTION DISH FOR MOUNTING WITHOUT INTERFERENCE

The invention relates to a counterbore protection dish formed in an aircraft mechanical part, to an aircraft mechanical part comprising a counterbore protected by such a dish, and to the application of such a dish to the assembly of an aircraft turbomachine directing blade in a casing of this turbomachine.

PRIOR ART

In a known manner, the attachment by screwing of a light alloy metal part, such as an aluminium alloy, to another part, is often achieved by way of a screw that penetrates into a counterbore of the alloy part and that is received into a thread of the other part, or that passes through the other part and is fixed to the back of this one by means of a nut. Since a light alloy part is inherently more sensitive to degradation than a steel part, the counterbore is generally equipped with a protection dish that fits into a barrel of the counterbore and the purpose of which is to protect the aluminium alloy part from friction from the screw head in bearing during tightening and also to distribute tightening stresses applied by the screw head on the light alloy part. Such a dish is for example described in document FR-3.032.223-A1.

For the dish to provide efficient protection of the barrel from friction due to the bearing of the screw head during tightening, it is essential to prevent the dish from rotating when the screw is being tightened. This is why such a protection dish is conventionally introduced into the barrel of the counterbore by shrink fitting, in other words it is inserted into the barrel using a press to a tight fit which prevents it from rotating and prevents it from escaping from the barrel.

The difficulty encountered when the dish is mounted with shrink fitting relates to mainly light alloy mechanical parts on which an anticorrosion treatment has been applied and/or that has been painted. When the dish is inserted in the barrel, due to the tight fit, there is interference between the periphery of the dish and the reaming of the barrel that is thus subject to a very high contact pressure that can affect the paint at the rim of the barrel or the anticorrosion protection layer since the placement stress is very important.

A turbomachine directing blade, in particular, is a part made of a light alloy with a special shape comprising essentially an airfoil provided with one single blade root or several blade roots, wherein counterbores are formed for attachment of the directing blade to a casing of the turbomachine. Due to the proximity of the counterbore axes with the airfoil, and the blade environment, the installation of the blade requires a special tooling that is not easy to use and that can sometimes lead to tool marks on the blade, requiring additional operations for treatment and touching up of these marks.

Conventionally, a protection dish has an axial section about an axis A having substantially the shape of a U. The dish thus comprises a substantially annular wall of axis A and a substantially cylindrical rim of axis A connected to an outer periphery of said substantially annular wall. The diameter of the annular wall of axis A is thus fixed and is very slightly greater than that of the counterbore barrel to allow the mounting of the dish according to a tight fit.

PRESENTATION OF THE INVENTION

The invention therefore aims to propose a protection dish for a counterbore of an aircraft mechanical part, of which the diameter of the annular wall can be reduced to allow the introduction thereof with clearance into the counterbore barrel, then expanded to allow the retention thereof in the barrel of the counterbore according to a tight fit.

For this purpose, the invention proposes a protection dish for a counterbore formed in an aircraft mechanical part, said dish having an axial section about an axis A having substantially the shape of a U, and comprising a substantially annular wall of axis A and a substantially cylindrical rim of axis A connected to an outer periphery of said substantially annular wall, characterised in that the dish is configured to be deformed in response to an axial stress of a determined intensity applied on the substantially annular wall thereof, from a first state, wherein the substantially cylindrical rim has a first transverse dimension E relative to the axis A to a second state, wherein the substantially annular wall being deformed, the cylindrical rim has a second transverse dimension E' relative to the axis A that is greater than the first transverse dimension E along a determined transverse direction T relative to the axis A.

According to other characteristics of the dish:
- the rim comprises two axial slits, aligned in a transverse plane P that passes through the axis A and that is perpendicular to the transverse direction T, said slits dividing said rim in plane P into two half-cylindrical walls with a diameter equal to the second transverse dimension E' each of which extends at least as far as the periphery of the substantially annular wall, and the substantially annular wall is deformable in said transverse direction T from an initial state associated with the first state of the dish, wherein the substantially annular wall has the first transverse dimension E, to a final state, associated with the second state of the dish, wherein the substantially annular wall has the second transverse dimension E',
- the axial slits extend in the substantially annular wall,
- the protection dish is made of a material of determined mechanical characteristics configured to allow the deformation of the substantially annular wall in response to the axial stress of determined intensity, and the substantially annular wall has a curved shape in the initial state thereof, that is curved inwards and/or folded symmetrically on each side of the plane of symmetry according to which it has the first transverse dimension E, and the substantially annular wall has, in the final state thereof, a plane shape according to which it has the second transverse dimension E',
- the determined material is configured such that the substantially annular wall deforms itself elastically in response to the axial stress of determined intensity,
- the determined material is configured such that the substantially annular wall plastically deforms itself in response to the axial stress of determined intensity.

The invention also relates to an aircraft mechanical part comprising a protected counterbore, said protected counterbore comprising a counterbore comprising a cylindrical wall of a determined diameter and a bottom wall contiguous to said cylindrical wall, said counterbore containing a protection dish of the type described above, characterised in that the first dimension and the determined diameter are arranged relative to each other with a clearance corresponding to a sliding fit, and in that the second dimension and the determined diameter are arranged relative to each other according to a clearance corresponding to a tight fit.

The invention also relates to a method of mounting a dish of the type described above in an aircraft mechanical part of the type described above, in order to obtain an aircraft mechanical part comprising a protected counterbore, characterised in that it comprises successively:
- a first step of introducing the protection dish into the counterbore of the part,
- a second step of introducing an element of stress into the dish,
- a third step of axially stressing the substantially annular wall of the protection dish by the stress application element, at the determined intensity.

This method and this mechanical part can advantageously be used to obtain a mounted directing blade assembly of an aircraft turbomachine, this assembly comprising a directing blade assembled to a turbomachine casing by at least one assembly screw. The blade comprises a root at at least one of the ends thereof comprising a counterbore, wherein a protection dish is fitted. A counterbore bottom wall and a substantially annular wall of the protection dish comprise bores configured to allow the passage of a body of an assembly screw that fits in said bores and in a bore in the turbomachine casing, and the protection dish is configured to receive a head of said screw. According to this assembly, the blade comprises a protected counterbore of the type described above and is assembled using the method of the type described above.

Finally, the invention relates to a method of assembling the assembly mounted above, characterised in that it comprises successively:
- a preliminary step to position the blade root so as to align the bore of the counterbore thereof with the bore in the casing,
- a first step, wherein the protection dish is inserted into the counterbore in the blade,
- a second step, wherein the screw is inserted through the dish and the counterbore as far as the bore in the casing,
- a third step during which the screw, forming the element of axial stress of the substantially annular wall of the protection dish, is tightened such that the head thereof deforms said substantially annular wall until it occupies the final position thereof.

DESCRIPTION OF THE FIGURES

The invention will be best understood, and other characteristics and advantages of the present invention will become clearer upon reading the following description given as a non-limiting example and in reference to the appended drawings, wherein.

DETAILED DESCRIPTION

In the following description, identical reference numbers designate identical parts or parts with similar functions.

Figure 1:
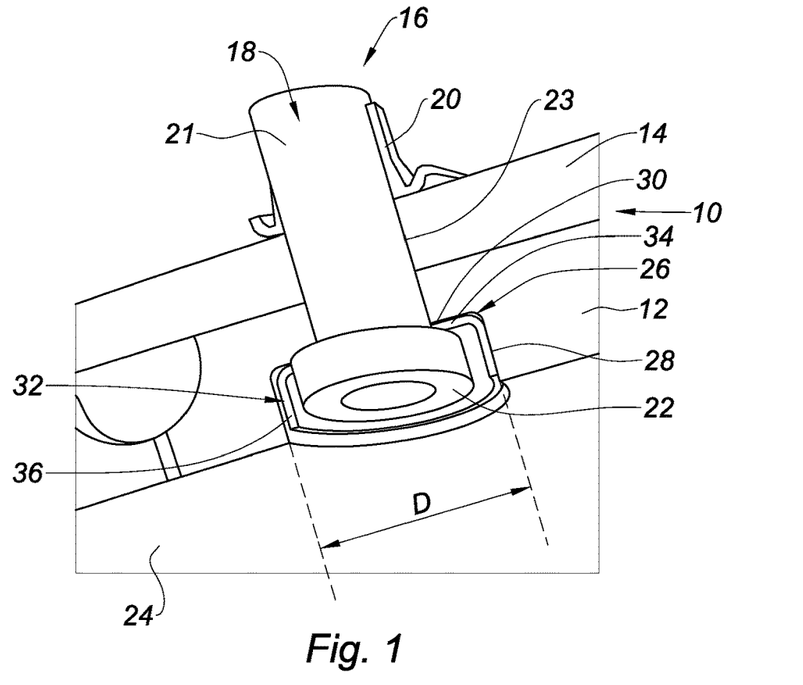
FIG. 1 is a perspective view of an assembly of a mechanical part, comprising a counterbore protected by a protection dish according to the state of the art, with another mechanical part.

An assembly 10 of a first aircraft mechanical part 12 assembled to a second mechanical part 14 by means of a screw-nut connection 16 comprising a screw 18 and a nut 20 that tighten the first and second parts 12, 14 one against the other is generally represented in FIG. 1. The screw 18 comprises a body 21 and a head 22. To prevent this from projecting from a surface 24 of the first part 12, the first aircraft mechanical part 12 comprises a counterbore 26 that is formed within the thickness thereof and that is intended to receive the head 22 of the screw 18. The counterbore 26 comprises a cylindrical wall 28 of a determined diameter D, this wall 28 also being known as a barrel. The counterbore 26 comprises a bottom wall 30 contiguous to said cylindrical wall 28.

To prevent rotation of the head 22 of the screw 18 from damaging the bottom wall 30 of the counterbore 26, the counterbore 26 receives, in a known manner, a protection dish 32 that is mounted in the counterbore 26 with a tight fit, in order to prevent it from being driven in rotation by the head 22 of the screw 18.

Figure 6A:
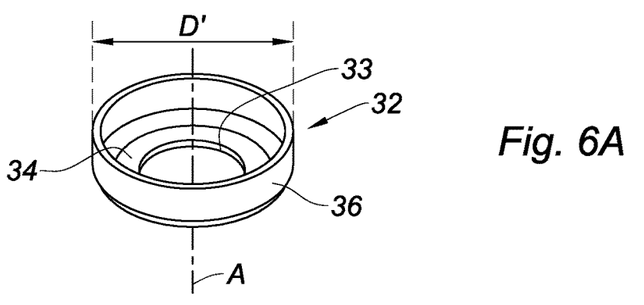
FIGS. 6A to 6C are respectively perspective, side and end views of a dish according to the state of the art.
Figure 6B:
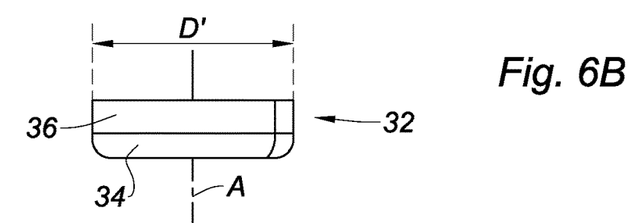
Figure 6C:
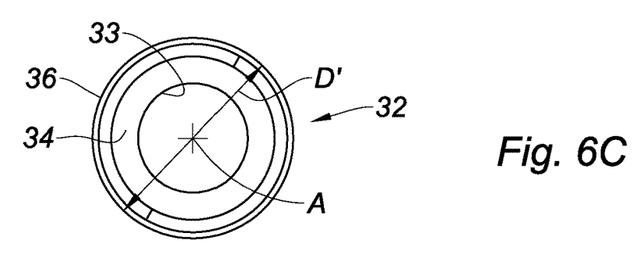

As illustrated in FIGS. 1 and 6A to 6B, the dish 32 has, in a known manner, an axial cross-section about an axis A having substantially the shape of a U. It comprises an annular wall 34 of axis A and a cylindrical rim 36 of axis A that is connected to an outer periphery of said annular wall 34. Conventionally, as illustrated on FIG. 2, the dish 32 is configured to be mounted by shrinking into the counterbore 26, i.e. by fitting such that the dish 32 and the counterbore 26 form a tight fit. The rim 36, with a fixed cylindrical section, has a diameter D' slightly greater than the diameter D of the barrel or the cylindrical wall 28 of the counterbore 26.

Figure 2:
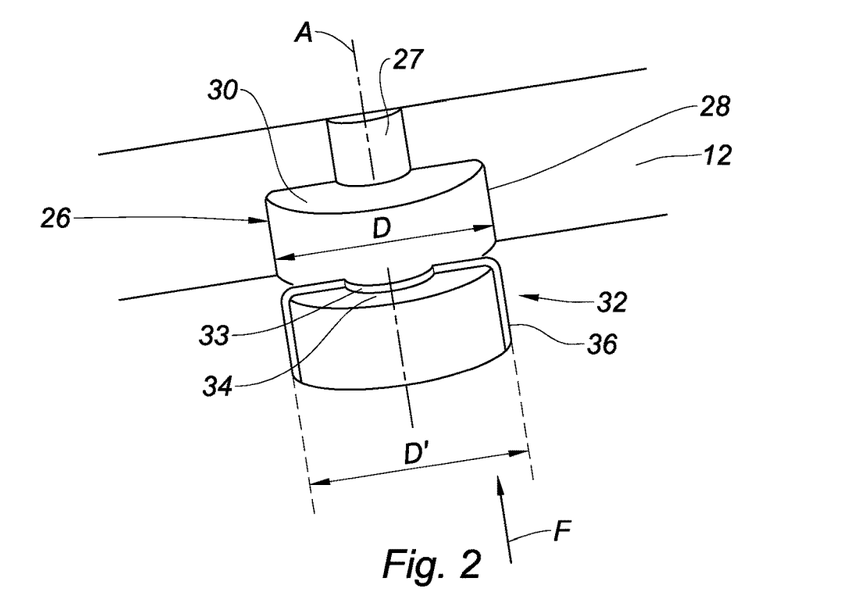
FIG. 2 is a perspective, cross-sectional view representing the mounting of a dish according to the state of the art in the counterbore of a mechanical part.

Conventionally, when the dish 32 is introduced into the barrel 28 along the direction of the arrow F, due to the difference between the diameter D' of the dish 32 and the diameter D of the barrel 28 of the counterbore 26 aimed at producing a tight fit, there is interference between the periphery of the dish 32 substantially at the level of the junction thereof with the wall 34, on the one hand, and the barrel 28, on the other hand. This interference zone is subjected to highly significant contact pressure, which can affect the paint on the part 12 around the rim of the barrel or a possible anticorrosion protection coat deposited on the part 12, as the placement effort is thus very significant. The mounting by fitting the dish 32 can therefore be detrimental to the retaining of the part 12.

Figure 3:
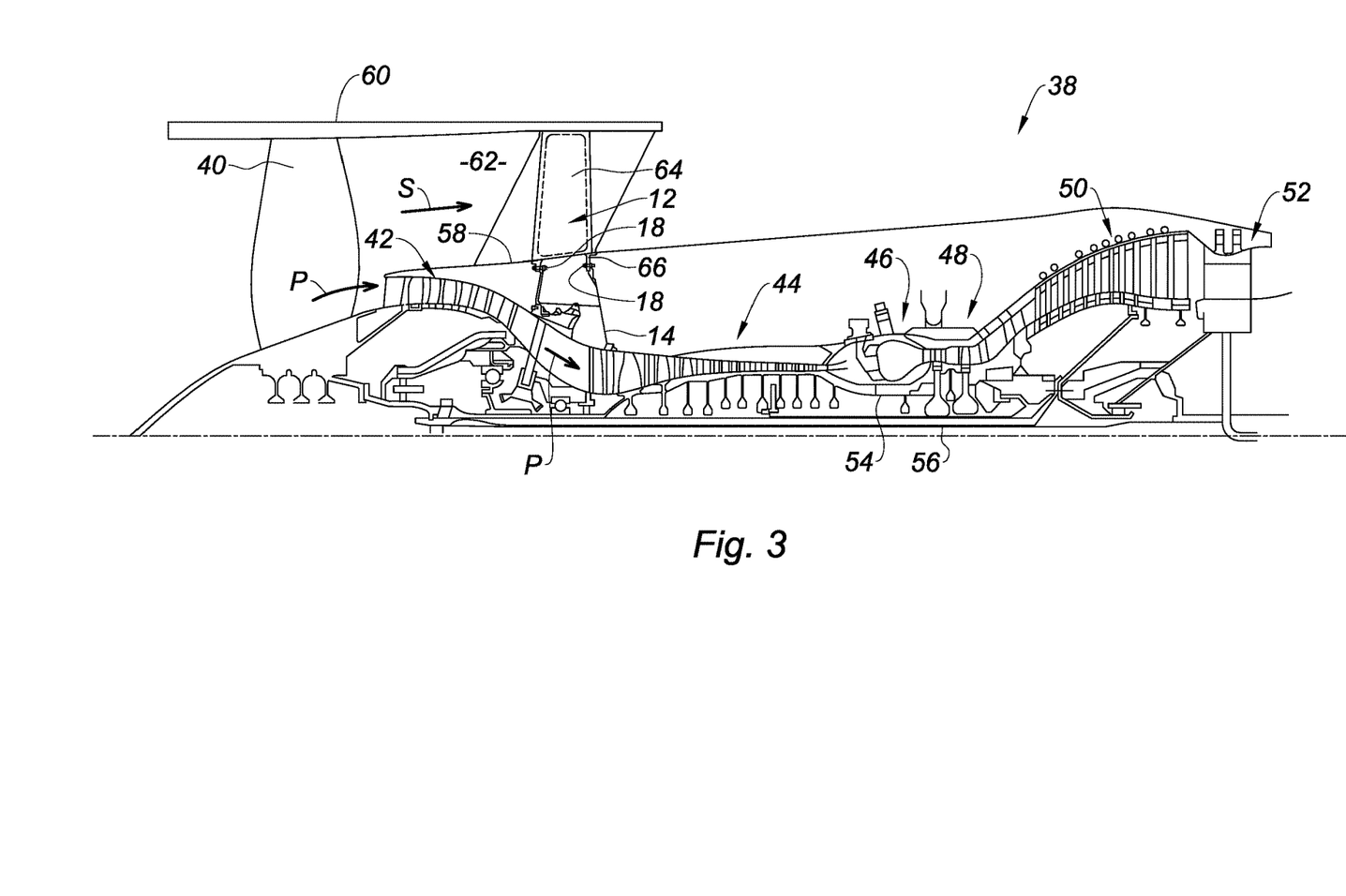
FIG. 3 is a schematic, cross-sectional view of a front part of a turbomachine illustrating the installation of a directing blade.
Figure 4:
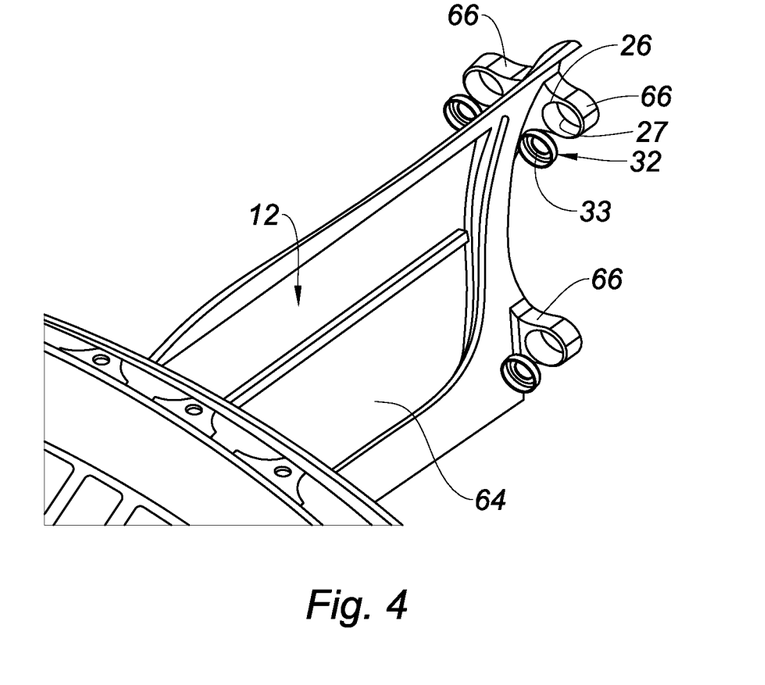
FIG. 4 is a detailed, exploded, perspective view of a directing blade and protection dishes of counterbores intended to equip this blade.

This problem is particularly sensitive when the aircraft mechanical part 12 is a directing blade 12 of a turbomachine 38 of the bypass type as represented in FIGS. 3 and 4.

Such a turbomachine 38, here a turbine engine 38, comprises, in a known manner, a fan 40, a low-pressure compressor 42, a high-pressure compressor 44, a combustion chamber 46, a high-pressure turbine 48, a low-pressure turbine 50 and an exhaust nozzle 52. The rotor of the high-pressure HP compressor 44 and the rotor of the high-pressure turbine 48 are connected through a high-pressure HP shaft 54 and together form a high-pressure body. The rotor of the low-pressure LP compressor 42 and the rotor of the low-pressure LP turbine 50 are connected through a low-pressure LP shaft 56 and together form a low-pressure body.

The high- and low-pressure bodies are passed through by a primary air flow "P" and the fan 40 produces a secondary air flow "S" that circulates in the turbine engine 38, between a casing 58 and an outer casing 60 of the turbine engine in a cold flow channel 62. At the outlet of the LP turbine 50, gases coming from the primary flow "P" are mixed with the secondary flow "S" to generate a propulsion force, the secondary flow "S" here providing most of the thrust.

The cold flow channel 62 receives outlet directing blades 12 that here form the aircraft mechanical parts considered and that are intended both to support the outer casing 60 and to straighten the direction of the gases in the secondary flow "S".

Figure 5:
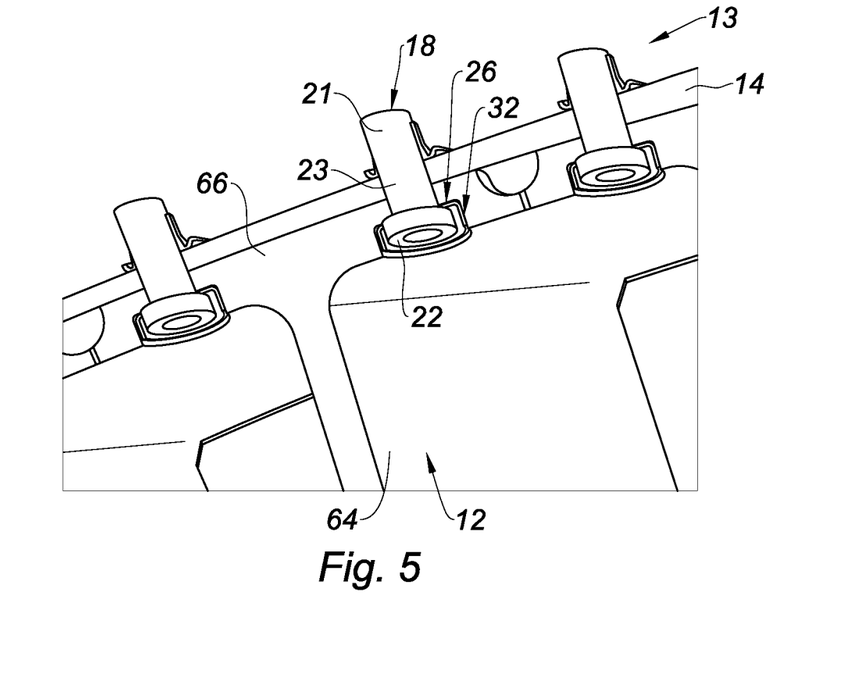
FIG. 5 is a detailed, perspective view of an assembly of a mechanical directing blade, comprising a counterbore protected by a protection dish according to the state of the art, with a turbomachine casing.

Each blade 12 comprises an airfoil 64 and at least one root 66 that is fixed to an inner casing 14 of the turbomachine by way of screws 18. In FIG. 4, a blade 12 comprising four roots 66 is represented, each comprising a counterbore 26 receiving a protection dish 32 fits, the bottom wall 30 of the counterbore 26 and the substantially annular wall 34 of the protection dish 32 comprising bores 27, 33 configured to allow the passage of a body of an assembly screw 18 received in a bore of the casing 14 of the turbomachine 3, and in a nut 20 on the back of this casing 14, as represented in FIG. 5. To this end, each protection dish 32 is configured to receive a head 22 of the associated screw 18.

In FIG. 5, a blade 12 comprising one single root 66 is represented as a variant, that extends from one side to the other of the airfoil 64 thereof, this root comprising counterbores 26 on either side of the airfoil 64, each of them receiving a protection dish 32.

Figure 7A:
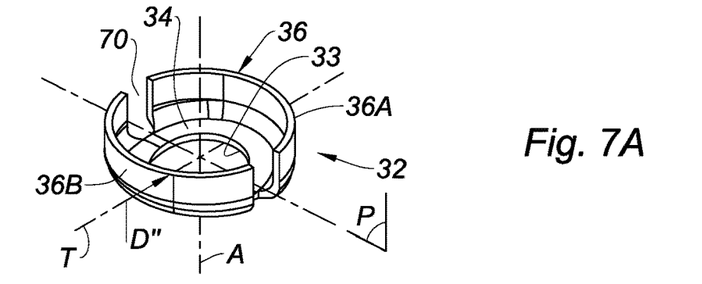
FIGS. 7A to 7D are respectively perspective, side and end views of a dish according to the invention.
Figure 7B:
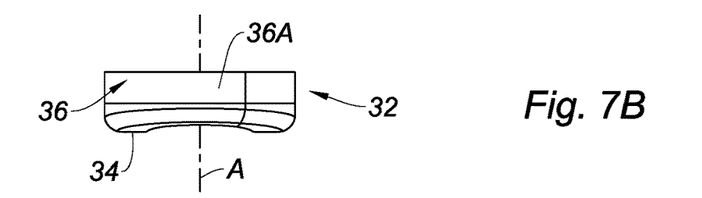
Figure 7C:
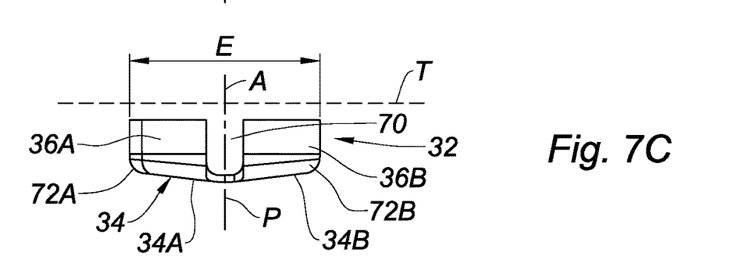
Figure 7D:
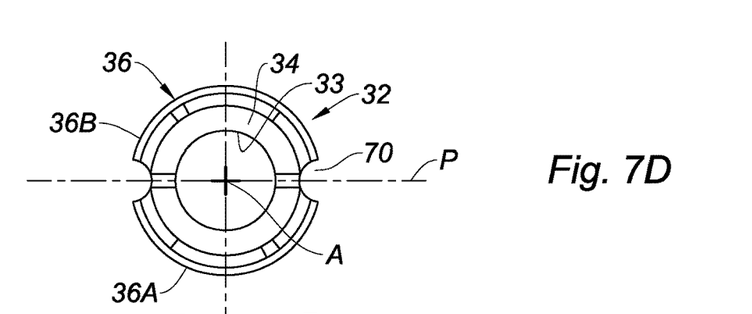
Figure 8:
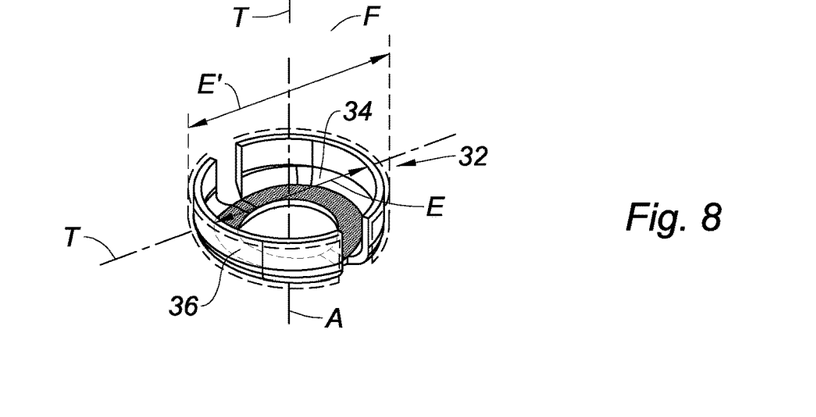
FIG. 8 is a perspective view illustrating the deformation of a dish according to the invention in case of axial stress.

To prevent that the introduction of the dish 32 damages the rim of the counterbore 26, the invention advantageously proposes a dish, no longer rigid as this was the case of the dishes 32 according to the state of the art, but an extendible dish 32 as represented in FIGS. 7A to 8.

To this end, the dish 32 comprises a substantially annular wall 34 that is deformable in order to make it possible for the transverse expansion of a rim 36 that is substantially cylindrical and that is capable of expanding by accompanying the deformation of the substantially annular wall 34 to which it is secured.

More specifically, the dish 32 according to the invention is configured to be deformed in response to an axial stress F of determined intensity applied on the substantially annular wall 34 thereof, from a first state represented in solid lines in FIG. 8, wherein the substantially cylindrical rim 36 occupies a first transverse dimension E relative to axis A, to a second state represented in dotted lines in FIG. 8 wherein, the substantially annular wall 34 being deformed, the cylindrical rim 36 has a second transverse dimension E' relative to the axis A that is greater than the first transverse dimension E along a determined transverse direction T relative to the axis A.

In other words, the dish 32 is configured to be able to expand along a direction T, transverse to the axis A when the substantially annular wall 34 thereof is axially stressed. By wisely selecting the dimensions of the first initial E dimension of the dish 32 to be slightly less than the diameter D of the counterbore 26, and suitable mechanical characteristics of the material of the dish 32 on which the value of the second final dimension E' thereof depends as being slightly greater than the diameter D of the counterbore 26, the dish 32 can be used and introduced with clearance into the counterbore 26, then expanded to the final dimension E' thereof, so as to be retained in the counterbore 26 according to a tight fit.

Several configurations can be considered to configure the dish 32 so as to allow the transverse expansion in the direction T in response to the stress F.

In the preferred embodiment of the invention, as represented in FIGS. 7A, 7C and 7D, the dish 32 according to the invention comprises a rim 36 that is provided with two axial slits 70, aligned along a transverse plane P that passes through the axis A and that is perpendicular to the transverse direction T. The slits 70 divide the rim 36 along the plane P into two half-cylindrical walls 36A and 36B, each of which follow a first diameter D" that determine a total dimension of the dish 32, once expanded along the direction T, equal to the second transverse dimension E'. Both of the two half-cylindrical walls 36A and 36B are each connected through the bases 72A, 72B thereof to the periphery of the substantially annular wall 34, as represented more specifically in FIG. 7C.

The substantially annular wall 34 is itself deformable along said transverse direction T from an initial state, associated with the first state of the dish 32, wherein the substantially annular wall 34 has the first transverse dimension E, to a final state, associated with the second state of the dish 32, wherein the substantially annular wall 34 has the second transverse dimension E'.

Advantageously, to facilitate the deformation of the wall 34, the axial slits 70 are extended into the substantially annular wall 34 so as to reduce the quantity of material that could oppose deformation of the wall 34.

It will thus be understood that each of the half-cylindrical walls 36A and 36B are configured according to the invariable diameter D' that determines, in the initial state of the wall 34, the first transverse dimension E of the dish 32 and in the final state of the wall 34, the second transverse dimension E' of the dish 32. The total dimension of the half-cylindrical walls 36A and 36B is thus also variable between the first transverse dimension E and the second transverse dimension E', as the half-cylindrical walls 36A and 36B are secured to the substantially annular wall 34, the transverse dimension of which varies from the first transverse dimension E to the second transverse dimension E' along the direction T when it is subjected to an axial stress F of a determined intensity.

It is therefore the particular configuration of the substantially annular 34 wall 34 that allows to vary the transverse dimension of the half-cylindrical walls 36A and 36B, and therefore the total transverse dimension of the dish 32.

The dish 32 is made of one single piece of the same material. This material has determined mechanical characteristics that are configured to allow the deformation of the substantially annular wall 34 in response to the axial stress F of determined intensity. To allow the variation of the dimension of the dish 32, the substantially annular wall 34 has a curved shape in the initial state thereof, that is curved inwards and/or folded symmetrically on either side of the plane P of symmetry, as represented in FIG. 7C. In this configuration, as illustrated in FIG. 7D, the annular wall 34 has substantially two half-annular branches 34A and 34B in the form of half-rings that form between them an angle of a few degrees along the transverse direction T and that, in the initial state of the substantially annular wall 34, occupy the transverse dimension E. When the annular wall is subjected to an axial stress of intensity F, the two half-annular branches 34A and 34B are folded down such that the substantially annular wall 34 has a plane shape, the two half-annular branches 34A and 34B then being in the same plane. Folding the two half-annular branches 34A and 34B down is accompanied by an increase in the dimension of the substantially annular wall 34, which, in the final state thereof, has a plane shape, according to which it has the second transverse dimension E', as can be seen in FIG. 8.

The mechanical characteristics of the dish 32 can allow to select the type of deformation that the dish 32 is able to be subjected to.

According to a first preferred embodiment of the invention, the determined material is configured, such that the substantially annular wall 34 is deformed elastically in response to the axial stress F of determined intensity. In this case, the dish 32 can be introduced into the counterbore 26 and can be immobilised in the counterbore 26 by the effect of the axial stress applied by the screw head 22. It can also be removed simply by loosening the screw 22, as the elastic deformation of the substantially annular wall 34 is reversible.

According to a second embodiment of the invention, the determined material is configured such that the substantially annular wall 34 is deformed plastically in response to the axial stress F of determined intensity, In this case, the dish 32 can be introduced into the counterbore 26 and locked in the counterbore 26 by the effect of the axial stress applied by the head of the screw 22, and cannot be removed when the screw 22 is loosened, because plastic deformation of the substantially annular wall 34 is irreversible.

Such a dish 32 allows to transform any aircraft mechanical part 12 comprising a counterbore 26 into an aircraft mechanical part 12 comprising a protected counterbore, provided simply that the dimensions E and E' of the dish 32 are selected suitably according to the diameter D of the counterbore 26, i.e. that the first dimension E and the determined diameter D are selected to be arranged relative to each other according to a clearance corresponding to a sliding fit in order to allow the frictionless mounting of the dish 32 in the counterbore 26, and that the second dimension E' and the determined diameter D are selected to be arranged relative to each other to have a clearance corresponding to a tight fit, in order to immobilise the dish 32 in the counterbore 26.

Figure 9:
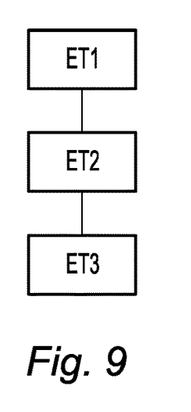
FIG. 9 is a block diagram illustrating the steps in a method of mounting a mechanical part comprising a counterbore protected by a dish according to the invention.

In this configuration, as illustrated in FIG. 9, a method of mounting a dish in such an aircraft mechanical part to obtain an aircraft mechanical part with a protected counterbore comprises successively a first step ET1 of introducing the protection dish 32 into the counterbore 26 of the part 12, and then a second step ET2 of introducing a stress application element into the dish, and finally a third step ET3 of axially stressing the substantially annular wall 34 of the protection dish 32 by the stress application element according to the determined intensity to ensure the deformation thereof.

In the first preferred embodiment of the invention, the dish 32 being elastically deformable, the stress application element must necessarily maintain the stress thereof on the dish 32 to ensure the maintaining of the dimension E' thereof. This is why the stress application element is preferably retained in a fixed position relative to the part 12. For example, it can consist of a screw 18.

In the second embodiment of the invention, the dish 32 being plastically deformable, the stress application element must not necessarily maintain the stress on the dish 32 to ensure the maintaining thereof in the counterbore 26. This is why the stress application element can be removeable. For example, it can consist of a piston of a hydraulic press.

The aircraft mechanical part 12, particularly when it is a turbomachine directing blade 12, can thus be assembled to the casing 14 of the turbomachine so as to constitute a mounted assembly 13 similar to that of FIG. 5, wherein it comprises a root 64 at least at one of the ends thereof, comprising a counterbore 26 that receives a protection dish 32, the wall 30 at the bottom of the counterbore 26 and the approximately annular wall 34 of the protection dish 32 comprising corresponding bores 27, 33 that are configured to allow the passage of a body 21 of an assembly screw 18 fixed through said bores 27, 33 and a bore 23 in the turbomachine casing 14. In this case, the protection dish 32 is configured to receive the head 22 of said screw 18, that constitutes the stress application element of the substantially annular wall 34.

Figure 10:
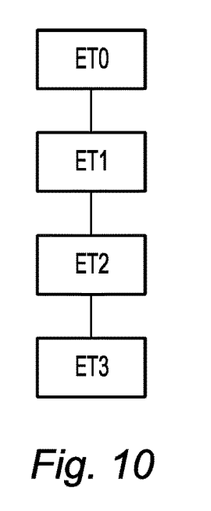
FIG. 10 is a block diagram illustrating the steps of a method of assembling a directing blade mounting to a turbomachine casing.

In this configuration, a method of assembling such an mounted directing blade assembly 13 comprises a preliminary step ET0 of positioning the root 66 of the blade 12 so as to align the bore 27 of the counterbore 26 thereof with the bore 23 in the casing 14. Then follows a first step of introducing ET1 the protection dish 32 into the counterbore 26 of the blade 12. Then, during a second step ET2, the screw 18 is introduced through the dish 32 and the counterbore 26 as far as the bore 23 of the casing 14. Finally, during a fourth step ET4, the screw 18 forming the axial stress application element of the substantially annular wall 34 of the protection dish 32, is tightened so that the head 22 thereof deforms said substantially annular wall 34 until it occupies the final position thereof of dimension E' where it immobilises the dish 32 in the counterbore 26.

The invention therefore to simply and reliably ensure the mounting without interference of a protection dish 32 in a counterbore of a turbomachine blade 12.

The invention claimed is:

1. A protection dish for a counterbore formed in an aircraft mechanical part, said counterbore comprising a bottom wall comprising a bore configured to allow the passage of a body of an assembly screw, said dish having an axial cross-section about an axis having the shape of a U, and comprising an annular wall of the axis comprising a bore configured to allow the passage of said body of the assembly screw and a cylindrical rim of the axis connected to an outer periphery of said annular wall, wherein said dish is configured to be deformed in response to an axial stress of a predetermined intensity applied on the annular wall thereof, from a first state wherein the cylindrical rim has a first transverse dimension relative to the axis, to a second state wherein the annular wall is deformed, the cylindrical rim has a second transverse dimension relative to the axis that is greater than the first transverse dimension along a transverse direction determined relative to the axis.

2. The protection dish according to claim 1, wherein the rim comprises two axial slits, aligned in a transverse plane that passes through the axis and that is perpendicular to the transverse direction, said slits dividing said rim in plane into two half-cylindrical walls of a diameter equal to the second transverse dimension and each said slit extending at least to the periphery of the annular wall, and in that the annular wall is deformable in said transverse direction from an initial state, associated to the first state of the dish, wherein the annular wall has the first transverse dimension, to a final state associated to the second state of the dish, wherein the annular wall has the second transverse dimension.

3. The protection dish according to claim 2, wherein the axial slits extend into the annular wall.

4. The protection dish according to claim 2, wherein said protection dish is made of a material of predetermined mechanical characteristics configured to allow the deformation of the annular wall in response to the axial stress of predetermined intensity, and in that the annular wall has a curved shape in the initial state thereof, that is curved inwards and/or folded on each side of the plane of alignment of the slits, symmetrically relative to said plane, such that the annular wall has the first transverse dimension, and in that the annular wall has, in the final state of the annular wall, a plane shape such that the annular wall has the second transverse dimension.

5. The protection dish according to claim 4, wherein the material is configured such that the annular wall is elastically deformed in response to the axial stress of determined intensity.

6. The protection dish according to claim 4, wherein the material is configured such that the annular wall is plastically deformed in response to the axial stress of given intensity applied to said annular wall.

7. An aircraft mechanical part comprising a protected counterbore, said protected counterbore comprising a counterbore comprising a cylindrical wall of a predetermined diameter and a bottom wall contiguous to said cylindrical wall, said counterbore receiving a protection dish said bottom wall comprising a bore configured to allow the passage of a body of an assembly screw, said protection dish having an axial cross-section about an axis having the shape of a U, and comprising an annular wall of the axis comprising a bore configured to allow the passage of said body of the assembly screw and a cylindrical rim of the axis connected to an outer periphery of said annular wall,
wherein said protection dish is configured to be deformed in response to an axial stress of a predetermined intensity applied on the annular wall thereof, from a first state to a second state, the cylindrical rim having a first transverse dimension relative to the axis,
wherein when the annular wall is deformed, the cylindrical rim has a second transverse dimension relative to the axis that is greater than the first transverse dimension along a transverse direction determined relative to the axis,
wherein the rim comprises two axial slits, aligned in a transverse plane that passes through the axis and that is perpendicular to the transverse direction, said slits dividing said rim into two half-cylindrical walls of a diameter equal to the second transverse dimension and each said slit extending at least to the periphery of the annular wall, and the annular wall is deformable in said transverse direction from an initial state, associated to the first state of the dish, to a final state associated to the second state of the dish,
wherein the annular wall has the first transverse dimension, and the second transverse dimension, and
wherein the first dimension and the predetermined diameter are arranged relative to each other with a first clearance therebetween providing a sliding fit between the rim and the cylindrical wall, and the second dimension and the predetermined diameter are arranged relative to each other with a second clearance therebetween providing a non-sliding fit between the rim and the cylindrical wall.

8. A method for mounting of a protection dish for a counterbore formed in an aircraft mechanical part, said counterbore comprising a bottom wall comprising a bore configured to allow the passage of a body of an assembly screw, said dish having an axial cross-section about an axis having the shape of a U, and comprising an annular wall of said axis comprising a bore configured to allow the passage of said body of the assembly screw and a substantially cylindrical rim of said axis connected to an outer periphery of said annular wall,
wherein said dish is configured to be deformed in response to an axial stress of a predetermined intensity applied on the annular wall thereof, from a first state wherein the cylindrical rim has a first transverse dimension relative to said axis, to a second state wherein the annular wall is deformed, the cylindrical rim has a second transverse dimension relative to the axis that is greater than the first transverse dimension along a transverse direction predetermined relative to said axis in an aircraft mechanical part to obtain an aircraft mechanical part comprising a protected counterbore according to claim 7,
wherein said method comprises successively:
a first step of introducing the protection dish into the counterbore of the part,
a second step of introducing a stress application element into the dish,
a third step of axially stressing the annular wall of the protection dish by the stress application element according to the predetermined intensity.

9. A mounted directing blade assembly of an aircraft turbomachine comprising a directing blade assembled to a casing of said turbomachine, said directing blade comprising at least at one of the ends thereof, a root comprising a counterbore receiving a protection dish, a wall at the bottom of the counterbore and an annular wall of the protection dish comprising bores configured to allow the passage of a body of an assembly screw received in said bores and a bore in the turbomachine casing, and the protection dish being configured to receive a head of said screw, wherein the blade comprises the protected counterbore assembled according to the method of claim 8.

10. A method for assembling a mounted directing blade assembly of an aircraft turbomachine according to claim 9, wherein said method comprises successively:
a preliminary step of positioning the root of the blade so as to align the bore of the counterbore thereof with the bore of the turbomachine casing,
a first step of introducing the protection dish into the counterbore of the blade,
a second step of introducing the screw through the dish and the counterbore to the bore of the casing,
a third step during which the screw, forming the axial stress application element of the annular wall of the protection casing, is tightened such that the head thereof deforms said annular wall until it occupies a final position thereof.

* * * * *